(12) United States Patent  
Upadhyay et al.

(10) Patent No.: US 12,307,633 B2
(45) Date of Patent: May 20, 2025

(54) SYSTEM AND METHOD FOR VISIBILITY CLARIFICATION OF COLOR IMAGES AND VIDEOS (71) Applicant: Lolaark Vision Inc.

(72) Inventors: Sanat Kumar Upadhyay, Ballia (IN); Emanuel Ioannis Papadakis, Houston, TX (US)

(73) Assignee: Lolaark Vision Inc., Houston, TX (US)

( * ) Notice: Subject to any disclaimer, the term of this patent is extended or adjusted under 35 U.S.C. 154(b) by 0 days.

(21) Appl. No.: 18/641,076

(22) Filed: Apr. 19, 2024

(65) Prior Publication Data

US 2024/0354902 A1 Oct. 24, 2024

Related U.S. Application Data (60) Provisional application No. 63/497,596, filed on Apr. 21, 2023.

(51) Int. Cl.
*G06T 5/50* (2006.01)
*G06T 5/20* (2006.01)
(Continued)

(52) U.S. Cl.
CPC ............... *G06T 5/50* (2013.01); *G06T 5/20* (2013.01); *G06T 5/70* (2024.01); *G06T 7/90* (2017.01);
(Continued)

(58) Field of Classification Search
CPC .... G06T 5/50; G06T 5/20; G06T 5/70; G06T 7/90; G06T 2207/10024;
(Continued)

(56) References Cited

U.S. PATENT DOCUMENTS

2005/0111693 A1* 5/2005 Loce .................. H04N 1/387  
    382/232
2023/0238078 A1* 7/2023 Gonzalez Lozano .................  
    G06T 7/0012  
    382/128

FOREIGN PATENT DOCUMENTS

CN     114529475 A  *  5/2022  ............... G06T 5/10

OTHER PUBLICATIONS

Dhana Lakshmi Muthuraman et al., "Visibility improvement of underwater turbid image using hybrid restoration network with weighted filter", Pub. Nov. 15, 2021 on journal of Multidimensional Systems and Signal Processing. (Year: 2021).*

(Continued)

*Primary Examiner* — Mekonen T Bekele
(74) *Attorney, Agent, or Firm* — Osha Bergman Watanabe & Burton LLP (57) ABSTRACT

A method and a system for visibility clarification in color images and videos is disclosed. The method includes obtaining a plurality of raw images using a digital or analog camera and determining parameters for a clarification filter in an image processing software. Further, the plurality of raw images is processed to filter the plurality of raw images using the clarification filter, wherein the clarification filter normalizes coefficients with respect to a local energy density and computes the synthesis multiscale transform based on the normalized coefficients. Additionally, the method includes displaying the processed plurality of raw images via clarifying software to obtain a clear video image in real time, wherein the clarifying software is a combination of the imaging processing software and the clarification filter.

20 Claims, 8 Drawing Sheets

(51) Int. Cl.
  *G06T 5/70* (2024.01)
  *G06T 7/90* (2017.01)
(52) U.S. Cl.
  CPC .............. *G06T 2207/10016* (2013.01); *G06T 2207/10024* (2013.01); *G06T 2207/10152* (2013.01); *G06T 2207/20016* (2013.01); *G06T 2207/20032* (2013.01); *G06T 2207/30168* (2013.01)
(58) Field of Classification Search
  CPC . G06T 2207/10152; G06T 2207/20016; G06T 2207/20032; G06T 2207/30168
  See application file for complete search history.

(56) References Cited

OTHER PUBLICATIONS

Sanat et al., , "Improving the Visibility of Underwater Video in Turbid Aqueous Environments", pub. Oct. 2, 2020 (Year: 2020).*

Rashid Khan "Underwater Image Restoration Using Fusion and Wavelet Transform Strategy" Jul. 2015 Journal of Computers ,2015 (Year: 2015).*

Dhana Lakshmi Muthuraman et al., "Visibility improvement of underwater turbid image using hybrid restoration network with weighted filter" journal of Multidimensional Systems and Signal Processing, Pub. Nov. 15, 2021.*

Upadhyay, Sanat, and Manos Papadakis, "Lifting the veil: enhancing images in turbid aqueous environments", Pre-Print of Proc. SPIE 11138, Wavelets and Sparsity XVIII, 111380W (Sep. 9, 2019); < https://doi.org/10.1117/12.2529981> (19 pages).

Upadhyay, Sanat, and Manos Papadakis, "Improving the Visibility of Underwater Video in Turbid Aqueous Environments", Paper presented at the SNAME Maritime Convention, Virtual (Sep. 29, 2020) (12 pages).

Upadhyay, Sanat, Mitsakos, Nikolaos, and Manos Papadakis, "Real Time Visibility Improvement for Underwater Video", Paper presented at the SNAME 23rd Offshore Symposium, Houston, Texas, Feb. 2018 (20 pages).

* cited by examiner

SYSTEM AND METHOD FOR VISIBILITY CLARIFICATION OF COLOR IMAGES AND VIDEOS

BACKGROUND

Illumination and light scatterers are important and uncontrollable factor affecting the extraction of information from still images and video. Although numerous attempts and substantial analysis have been applied to the subject, the problem posed by uncontrolled illumination or suspended particles scattering light in water or in the atmosphere remains unsolved. The greatest need is for techniques capable of neutralizing illumination effects, especially in outdoor and other uncontrollable conditions which occur frequently in natural images and video and for improving or restoring visibility. Illumination neutralization and visibility restoration or improvement need to be implementable with high-speed and accuracy, thereby enhancing the robustness of quantitative/decision making from input provided by images or video where visibility is improved, or the effects of uncontrollable illumination are the greatest.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method for image and video clarification. The method includes obtaining a plurality of raw images using a digital or analog camera and determining parameters for a clarification filter in an image processing software. Further, the plurality of raw images is processed using the clarification filter to filter each raw image, wherein the clarification filter non-linearly transforms coefficients and applies a synthesis multiscale transform. Additionally, the method includes displaying the processed plurality of raw images via clarifying software to obtain a clear video image in real time, wherein the clarifying software is a combination of the imaging processing software and the clarification filter.

In general, in one aspect, embodiments disclosed herein relate to a system including a camera coupled to a computer processor, a display for displaying a processed plurality of raw images via a clarifying software to obtain a clear video image in real time, wherein the clarifying software is a combination of the imaging processing software and a clarification filter, and a computer processor. Further, the computer processor comprises functionality for processing the plurality of raw images using the clarification filter to filter each raw image, wherein the clarification filter non-linearly transforms coefficients and applies a synthesis multiscale transform. Additionally, the computer processor comprises functionality for filtering the plurality of raw images using the clarification filter, wherein the clarification filter performs a non-linear normalization operation on multiscale decomposition coefficients using a local energy density and computes synthesis multiscale transform based on the normalized coefficients.

In general, in one aspect, embodiments disclosed herein relate to a non-transitory computer readable medium storing a set of instructions executable by a computer processor, the set of instructions including the functionality for obtaining a plurality of raw images using a digital or analog camera and determining parameters for a clarification filter in an image processing software. Further, the plurality of raw images is processed using the clarification filter to filter each raw image, wherein the clarification filter non-linearly transforms coefficients and applies a synthesis multiscale transform. Further, the processed plurality of raw images are displayed via clarifying software to obtain a clear video image in real time, wherein the clarifying software is a combination of the imaging processing software and the clarification filter.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Embodiments disclosed herein provide a method and system for visibility clarification of color images and videos. Visibility clarification may be an outcome of the illumination neutralization where non-noise image corruption is removed or attenuated due to the geometric separation properties of the multiscale transforms utilized in the neutralization. The output image in visibility clarification may be equivalent to the true uncorrupt image in the sense that shapes, textures and surface details remain identifiable by an intelligent system or by a human. The disclosure addresses the problem of visibility clarification in still images or video sequences acquired with digital or analog cameras on the ground in the air or underwater under conditions inhibiting image clarity, such as fog, rain, haze, smoke, presence of water vapors and water turbidity.

Quantitative analysis or decision making will be aided by the comparative inspection of the side-by-side display of the original input and the visibility improved image/video. Embodiments of this method can benefit the analysis, both automated or manual of still images or video acquired under poor or uneven illumination or conditions inhibiting visibility, among them turbid water in underwater photography or videography, haze, smoke or fog.

Algorithms used for neutralizing the effects of illumination may be algorithms that treat the illumination problem as a relighting problem and algorithms that treat the illumination problem as an unlighting problem. The illumination neutralization can be regarded as an easier version of the unlighting problem, where light may be completely removed. The relighting methods attempt to improve the similarity of native illumination between gallery images and a probe image in a face recognition task and, in general, tend to even out differences in illumination between two or more images. For unlighting methods, the modeling of backscattered light in a scene is based on Lambertian reflectivity, and the goal is to generate a derivative image containing only the information related to the reflectivity properties of the objects in the image. The principal difference between these two methodological approaches to the neutralization of effects of illumination is that unlighting uses only a single input image, while relighting uses multiple images of the same scene acquired under non-identical illuminations.

Figure 1:
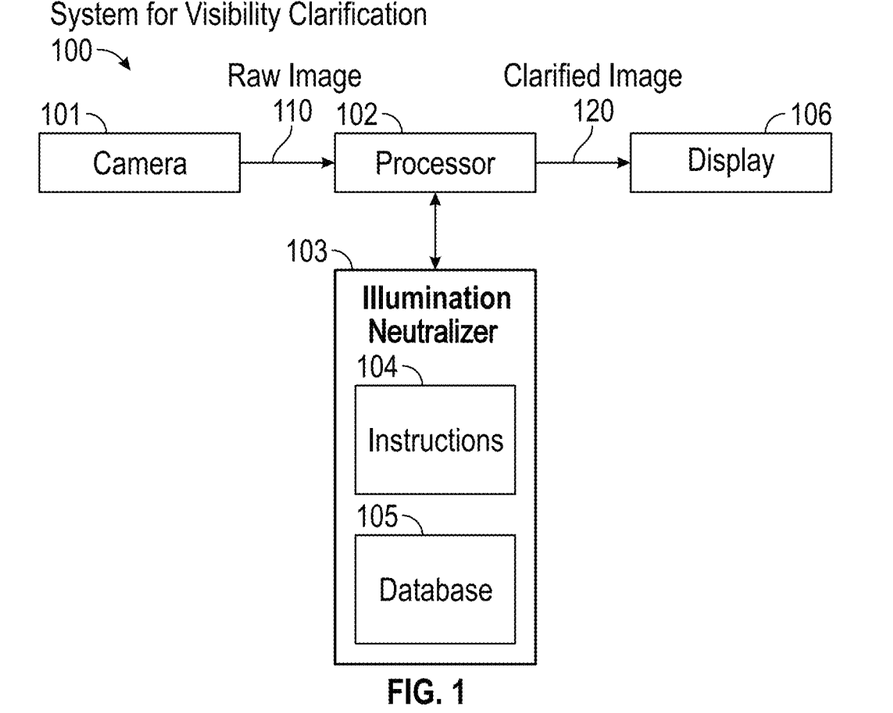
FIG. 1 shows an image and video clarification system in accordance with one or more embodiments.

Illumination neutralization is the process of extracting a derivative image from a single input which contains a satisfactory approximation of shapes and surfaces of a scene depicted in the original image and this derivative image is invariant under illumination conditions of the scene. Accordingly, illumination neutralization may be considered as falling in the category of unlighting. Visibility clarification in an image or video frames is a process where, due to the interaction of luminous energy with the medium and scatterers therein, the details of structures that become less visible or difficult to manually detect with visual inspection or automatically identify with an expert system, become adequately visible to the extent that ambiguity about their nature is eliminated. Further, the video frames may be obtained by sequencing a video into a plurality of consecutive images, called frames, played at a predetermined frequency and the processing may be applied to the plurality of consecutive images FIG. 1 shows an exemplary system for visibility clarification of color image and video frames (100) in accordance with one or more embodiments. The system (100) includes a camera (101), a processor (102), an illumination neutralizer (103), and a display (106). An image capturing device may be exemplified by a camera (101). A digital or analog camera is able to process raw image data (110) and present it on a display (106) or store it into a database (105).

The raw image data (110), captured by the camera (101), is used as an input to the processor (102). The processor (102) transforms the raw image data (110) to a computer interpretable format suitable for an image or video recording. In one or more embodiments, processor (102) interacts with the illumination neutralizer (103). The processor sends the raw image data (110) and transformed raw image data to one or more databases in the illumination neutralizer (103). In one or more embodiments, the plurality of databases (105) may store the raw image data (110), transformed raw image data, and clarified image data (120).

The illumination neutralizer (103) additionally contains instructions (104) for clarifying the transformed raw data into the clarified image data (120). The instructions (104) of the illumination neutralizer (103) are executed by the processor (102) to produce an clarified image data (120) from the transformed raw data. The illumination neutralizer (103) may be configured with one or more configurations to simultaneously perform one or more image clarification processes. In one or more embodiments, the instructions (104) may contain parameters for, at least, a denoising filter for a hue channel, a transformation for a saturation channel, and an algorithm for a value channel. The clarified image data is transmitted to the display (106) for a user review.

Figure 2:
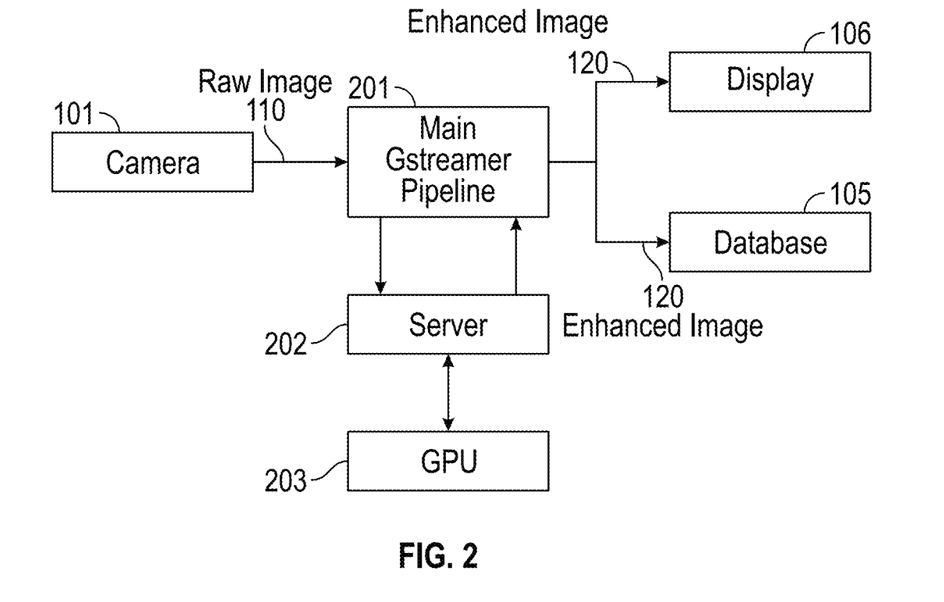
FIG. 2 shows an image and video clarification system in accordance with one or more embodiments.

FIG. 2 shows the one or more embodiments of the illumination neutralizer (103) for the still image and video frames visibility improvement. Specifically, the processor (102) communicates with the input and output devices in the image and video frames clarifier system. The inputs of the system are a stream of digitized images in the form of video footage with or without audio acquired by the camera (101) and a microphone respectively. The audio is separated from the video stream. In one or more embodiments, the processor (102) may be a graphics card unit (GPU) (203).

The main Gstreamer pipeline (201) processes the input by digitizing, separating, and encoding in IEEE encoding protocols for signals, processing the traffic of multiple input-output channels. The main Gstreamer pipeline (201) may be implemented by a multiple video/audio stream handling application similar or same as Gstreamer. Additionally, the main Gstreamer pipeline (201) also time-stamps each frame of the input video footage. Further, the main Gstreamer pipeline (201) passes the separated video footage to the application sink which is implemented by the processor (102). The audio signal is maintained in the memory of the computer. The video footage is separated in individual frames.

The main Gstreamer pipeline (201) passes the individual frames to the server (202) which is a software component handling image input and output traffic. The server (202) sends each individual frame to the processor (102). The output of the processor (102) is sent to the server and which passes the output to an application sink, which functions as a buffer. This application sink sends the processed individual frames to the main Gstreamer pipeline (201).

Figure 7:
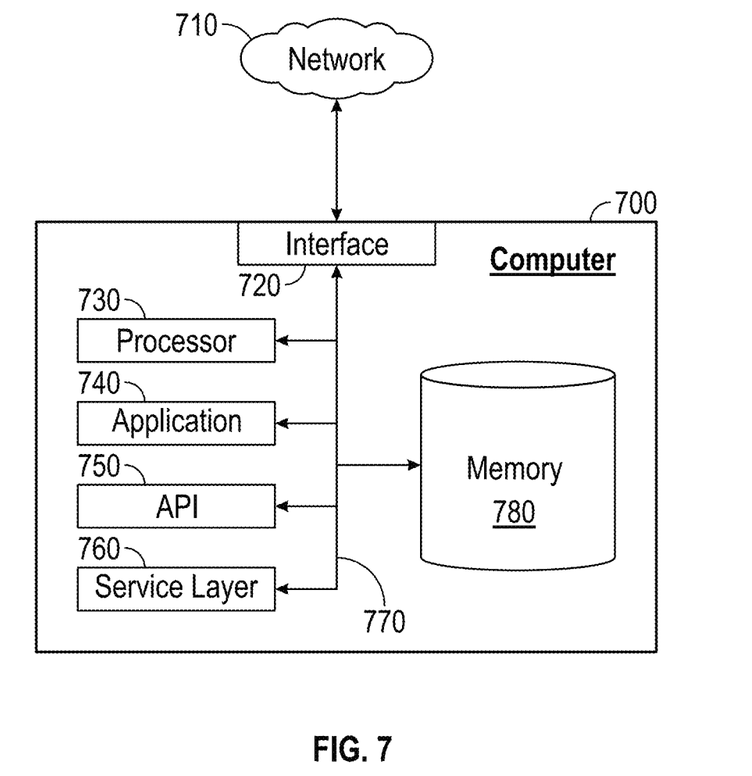
FIG. 7 shows a computer system in accordance with one or more embodiments.

The main Gstreamer pipeline (201) assembles individual frames in chronological order according to their time stamps and synchronizes with the original video stream. The two synchronized video streams are combined in a new video stream and encoded with an IEEE protocol for video. The combined video stream displays them side by side synchronized with the audio stream. This final display and synchronization step is implemented in the computer system (700). The side-by-side video stream along with the audio can be sent to a memory (780) in the computer system (700) while it is shown in the display (106) and/or transmitted to a remote location.

Figure 3:
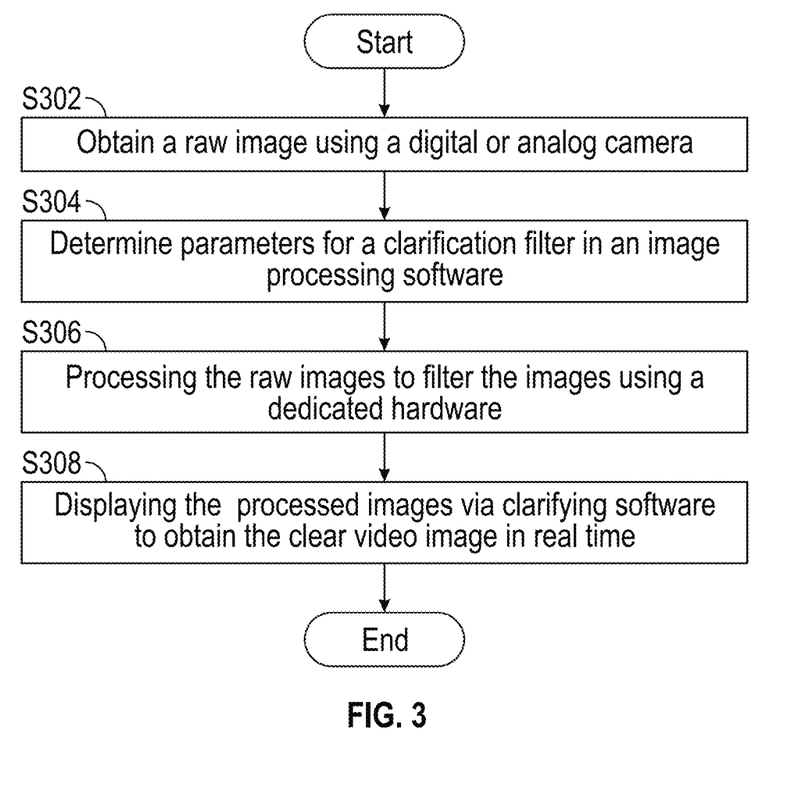
FIG. 3 shows a flowchart for visibility clarification of image and video in accordance with one or more embodiments.

FIG. 3 shows a flowchart in accordance with one or more embodiments. Specifically, the flowchart illustrates a method for visibility clarification of color image and video frames. Further, one or more blocks in FIG. 3 may be performed by one or more components as described in FIGS. 1 and 2. While the various blocks in FIG. 3 are presented and described sequentially, one of ordinary skill in the art will appreciate that some or all of the blocks may be executed in a different order, may be combined or omitted, and some or all of the blocks may be executed in parallel. Furthermore, the blocks may be performed actively or passively.

In Step S302, a raw image data (110) is obtained using a digital or analog camera (101). The camera may be handheld or be a part of a bigger manual or automatic system, such as the satellite imaging. The obtained raw image data (110) may be, at least, a binary image, a monochrome image, a color image, or a multispectral image. The image data (110) values, expressed in pixels, may be combined in various proportions to obtain any color in a spectrum. In one or more embodiments, the image data (110) may have been captured and stored in a non-transient computer-readable medium as described in FIG. 7. The captured image may be of any resolution. The captured image is an N-dimensional matrix with dimension size, $(ll_1, ll_2, \ldots, ll_N)$ where N is the number of dimensions. For example, the number of channels is 2 for grayscale video frames or image frames. Further, the video is determined to be a sequence of images played at a predetermined frequency, which is expressed by frames per second. Further, the videos are processed by extracting frames as images and processing them independently of each other.

In Step S304, the raw image data (110) is uploaded to image processing software. In one or more embodiments, a user or the image processing software may determine parameters for filtering, based on a vertical (e.g., a particular application) for which the raw image data (110) is obtained, and the quality of data. A person skilled in the art would appreciate that due to the changes in surroundings, the above applications would require different parameters to optimize the video frames clarifier. Additionally, a person skilled in the art would appreciate that cameras with different video qualities, such as HD and 4K, would also require different parameters.

In one or more embodiments, different parameters may be used for different verticals. Specifically, for subaquatic live video frames at resolution of 1080p filters with a high approximation order low denoising exponents and with the contrast parameter θ=1 may be used. When the same resolution video frames recorded with foggy or hazy conditions in daylight are processed, filters with small approximation order, medium denoising exponents and contrast θ much greater than 1 may be used. Further, for fog or rain conditions only two scales of dyadic decomposition may be used. For nighttime video frames at 4K resolution, the intermediate approximation order filters and similar contrast as before and a high denoising coefficient may be used to suppress nighttime thermal noise. Furthermore, the contribution of filters along diagonal or other orientations may be varied to promote better separation of shapes from the contribution of particles affecting visibility in image formation, using two or four scales of dyadic decomposition. In subaquatic video frames in turbid environments the full spectrum of dyadic decomposition may be used.

In one or more embodiments, the image processing software may be a stand-alone application coupled to a hardware as described in FIG. 7. Alternatively, the image processing software may be any commercially available software allowing image manipulation. In one or more embodiments, the method for visibility clarification of images and video frames may be implemented as a plug-in module which applies a predetermined image processing to the raw image data (110). In other words, in one or more embodiments, the illumination neutralizer (103) may be applied as a plug-in to existing image processing software already in place for processing images for purposes of the navigational or operational applications discussed above.

In Step S306, the image processing software processes the raw image data (110) to filter the image using dedicated hardware. Initially, the raw image data values, expressed in pixels, may be converted to floating point values or percentages. Additionally, the boundaries of the image may be padded or extended with mirror reflection of the image relative to its boundaries, to obtain the final image size.

In one or more embodiments, a non-linear transformation is applied to multiscale analysis coefficients $C_{t_j,j,k}$ depending on filter sparsity, orientation, and anisotropy that aims to capture image wavefronts such as edges and boundaries of shapes as well as textures. The output of this transformation is used as an input for the synthesis multiscale transform. The indexing $t_j$ of framelets defining the multiscale analysis transform accounts for an increasing number of framelets as the scale j increases. Framelets may vary from isotropic to anisotropic with the anisotropy increasing with scale. The non-linear transformation applied to the $C_{t_j,j,k}$ is multiplied by a weight $N_{t_j,j,k}$ generated by a weighted gamma seminorm resulting from the discrete convolution of an averaging kernel with the intensity values of the input image. The averaging kernel matches the sparsity and anisotropy of the framelet indexed by $t_j$ at the location determined by k and scale j. The transformed coefficient $D_{t_j,j,k}$ corresponding to $C_{t_j,j,k}$ is derived by the application of an optional hard or a soft thresholding operation on the product $N_{t_j,j,k} C_{t_j,j,k}$ dictated by the specific application aiming to retain products $N_{t_j,j,k} C_{t_j,j,k}$ associated with singularities such as edges and shapes. In one or more embodiments, a non-linear transformation is applied to the multiscale analysis coefficients $C_{t,j,k}$ depending on filter sparsity, orientation, anisotropy that aims to capture image wavefronts such as edges and boundaries of shapes as well as textures. The application of this transformation gives $D_{t,j,k}$.

The multiscale transforms may decompose signals or images into multiple scales or resolutions. The multiscale transforms may be used for analyzing signals at different levels of detail and for extracting features that may be hidden at different scales. Further, the synthesis multiscale transforms, in particular, may be multiscale transforms that reconstruct a signal or image from its component parts. The reconstruction involves combining the framelet coefficients or other multiscale transform coefficients that were obtained during the decomposition process.

In one or more embodiments, after obtaining the final size of the image, the multiscale analysis decomposition is applied to the image. Specifically, compactly supported isotropic or anisotropic framelets with selective spatial orientations are used for the multiscale transforms implementing analysis and synthesis. The resolution of the image at a lowest level, where the scaling function coefficients may be computed, is scale of 0 or $-J_0$, depending on the initial image or video frames frame resolution level determined by convention. The multiscale transformation analysis coefficients, $C_{t,j,k}$ are computed, with respect to a framelet filter, Fname, henceforth referred to as filter, corresponding to each scale in $0 \leq j \leq J_0$. Specifically, t denotes an index marking an appropriate frame filter, k denotes a location, and $J_0$ denotes used levels of framelet decomposition and may be set default to 4, 5, or higher depending on input image resolution and on scope of the neutralization application. For example, $J_0$ is reduced not to exceed 2 or 3, when the raw images are obtained in fog scenes or night scenes. In one or more embodiments, the framelet filter, Fname, may be used for analysis and synthesis and it may be set by default to symlets with a high approximation order. Alternatively, for certain embodiments, we may use pairs of filters for analysis with a matching filter for synthesis with various approximation orders as explained above. Filters may have varying degrees of anisotropy to make them suitable for distinguishing shapes from the texture created by light scattering on suspended particles.

In one or more embodiments, the coefficients $D_{t,j,k}$ are synthesized using the synthesis filters of Fname to compute the synthesis multiscale transform. The output of the synthesis multiscale transform is a processed illumination neutralized output image. Depending on the filter properties and the parameters used to generate the clarified image, the shapes and shape details are ready to appear with higher clarity after applying S308.

In Step S308, the clarified image is displayed via image rendering software in real time. Initially, the processed picture's size is reverted to original size. For example, if the padding was added to the raw image in Step S306, the padding is removed from the processed image. Additionally, the potential outliers may be removed from the processed image based on valued of OutlierCaps vector, which sets lower and upper output values. For example, all values outside of lower and upper output values may be removed. The OutlierCaps vector may differ for each scale and orientation to achieve a better depiction of shapes and a higher suppression of the visual effects of light scattering.

Additionally, the normalization of the analysis coefficients may reduce the range of intensity values present in the processed image. In one or more embodiments, a piece-wise linear transformation may be applied to adjust intensity values between range 0 and 1. The transformation maps values, lesser than median intensity of the processed image, linearly between 0 and 0.5 and maps values, higher than median intensity of the processed image, linearly between 0.5 and 1. Results of the system and method for visibility clarification of images and video frames are shown in FIGS. 5A-6D.

Figure 4:
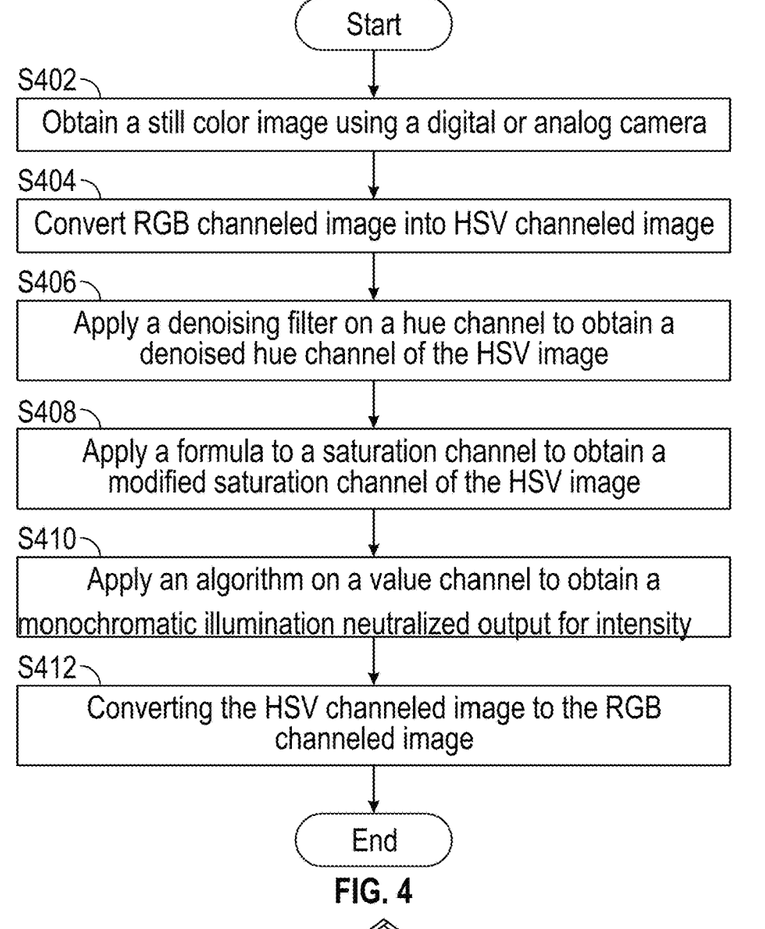
FIG. 4 shows an exemplary flowchart for visibility clarification of color image and video in accordance with one or more embodiments.

FIG. 4 shows a flowchart in accordance with one or more embodiments. Further, to the general description provided in FIG. 3, FIG. 4 shows an example flowchart, which illustrates a method for visibility clarification of color image and video frames. Further, one or more blocks in FIG. 4 may be performed by one or more components as described in FIGS. 1 and 2. While the various blocks in FIG. 4 are presented and described sequentially, one of ordinary skill in the art will appreciate that some or all of the blocks may be executed in a different order, may be combined or omitted, and some or all of the blocks may be executed in parallel. Furthermore, the blocks may be performed actively or passively.

Initially, a raw image data (110) is obtained using a digital or analog camera (101) operating in one or more spectral bands not necessarily limited to the human visual spectrum. The camera may be handheld or a part of a bigger manual or automatic system, such as the satellite imaging or a remotely operated vehicle or an autonomous vehicle. The obtained raw image data (110) is a color image represented by M×N×3 matrix which represents red, green, and blue (RGB) values. The RGB values may be combined in various proportions to obtain any color in a spectrum visible to a human eye. Levels of RGB range from 0% to 100% intensity and each value is represented in numbers from 0 to 255. For videos, a color video is determined to be a sequence of RGB images played at a predetermined frequency, which is expressed by frames per second. Further, the color videos are processed by extracting frames as RGB images and processing them independently of each other (S402).

The RGB values are converted to hue, saturation, and value (HSV) values. The conversion of the RGB values to HSV values decouples image data into a chromatic information and an intensity information. The chromatic information is captured by hue and saturation channels. The intensity information is captured by the value channel. The conversion is processed using at least one of the formulas well-known in the art (S404).

In one or more embodiments, a plurality of morphological filters, such as median filters, may be used on the hue channel to remove a noise, which may arise due to the presence of very small, suspended particles in the medium that cause light scattering and haze (S406). Further, the saturation channel is modified according to the following formula:

$$y(x) = \begin{cases} \theta x, & \theta x \leq 128 \\ \dfrac{127(\theta x - 128)}{255\theta - 128}, & \text{otherwise} \end{cases} \quad \text{(Equation 1)}$$

Where $\theta$ signifies a user defined positive number, x signifies old saturation values, and y signifies new saturation values (S408).

Further, the value channel is modified using an algorithm to obtain monochromatic illumination normalized output for intensity (S410), as described in Step S306.

The updated HSV channels are converted into the equivalent RGB channel to obtain illumination neutralized color image (S412). The conversion is processed using at least one of the formulas well-known in the art.

In one or more embodiments, the system and method for visibility clarification of image and video frames has different applications in a plurality of verticals. The verticals may include underwater, land, and air verticals. A person skilled in the art would appreciate that due to the changes in surroundings, the above applications would require different parameters to optimize the video frames clarifier. Additionally, a person skilled in the art would appreciate that cameras with different video frames qualities, such as HD and 4K, would also require different parameters.

Additionally, applying the video frames clarifier in different verticals helps with improving the performance of navigational and operational systems such diving cameras under water and surveillance cameras on land. Additionally, the video frames clarifier may be used in improving navigational and operational systems of, at least, helicopters, drones, submarines, autonomous vehicles, emergency vehicles, etc. FIGS. 5A-5E show the application of the system and method in multiple verticals.

FIGS. 5A-5E show a trial with a collected numerical data and video frames, evaluating quantitatively and qualitatively the performance of the system and method for visibility clarification of images and video frames in real time. During the testing, the water turbidity was measured at 13.5 Nephelometric Turbidity Unit (NTU). A standard HD-SDI camera with two light sources of 5000 lumens was used. The camera may be replaced with any other camera that can deliver an HD-SDI stream or a raw digital stream. The method for visibility clarification of images and video frames in real time was coupled to a hardware, as described on FIG. 7. The video frames stream was captured at 30 frames per second with 1080p resolution. The test object used in this trial is a test plate shown on FIG. 5A. The test plate consists of three visibly separate plates, with a screw, a hole, and numbers 3 and 1, and 2 written on them.

The ratio R2/R1 shows how much the video frames clarifier increases the horizontal visibility radius, where R1 denotes the maximum distance from the camera to an object whose presence can be unambiguously observed on the raw video frames stream panel and R2 denotes a maximum distance form camera to an object whose presence can be unambiguously observed on the clarified video frames stream panel. The ratio R4/R3 shows how much the video frames clarifier increases visual clarification, where R3 denotes the maximum distance allowing all surface details to be easily visible on the raw video frames stream panel and R4 denotes the maximum distance allowing all surface details to be easily visible on the clarified video frames stream panel. The key idea behind this ratio is that under poor visibility conditions, as long as the camera is very close to a surface of interest surface, details are viewable. The video frames clarifier allows the topside viewers to observe the same details by placing the camera at a distance R4, which is greater than distance R3. Therefore, the ratio R4/R3 serves as a proxy of the video frames clarification factor. During the trial, R1 was 24 inches and after using the video frames clarifier R2 was 33 inches. Similarly, R3 was 9 inches and R4 was 21 inches.

As such, the video frames clarifier increased the horizontal visibility radius by 37% and achieved a video frames clarification factor of 2.33, meaning that video frames clarifier increases a distance from which all surface details are easily visible by 2.33 times. Additionally, the video frames clarifier is assessed according to Underwater Image Quality Measure (UIQM). UIQM is a metric given in a form of a numerical score and combines an evaluation of a color faithfulness, a shape clarity, and a quality of contrast. Further, UIQM is applied on a single image and does not require a comparison of multiple images. The video frames clarifier improves the UIQM score by a factor of 160% on average.

Figure 5A:
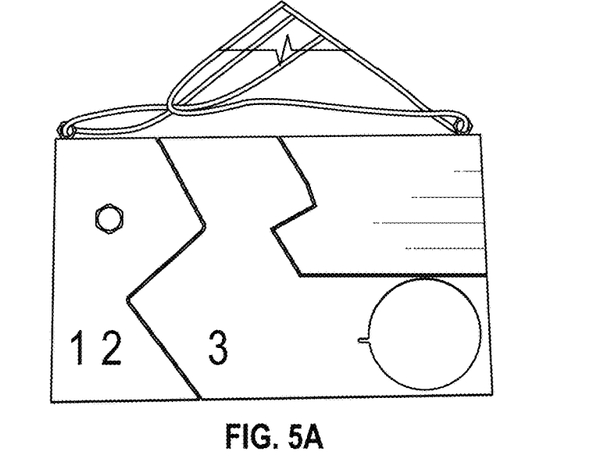
FIGS. 5A-5E shows an example in accordance with one or more embodiments.
Figure 5B:
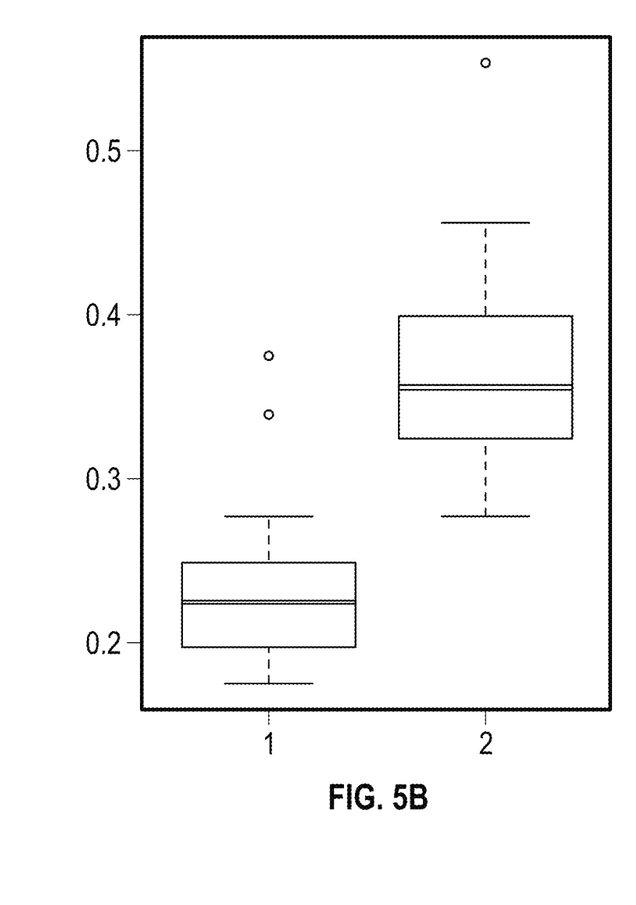
Figure 5C:
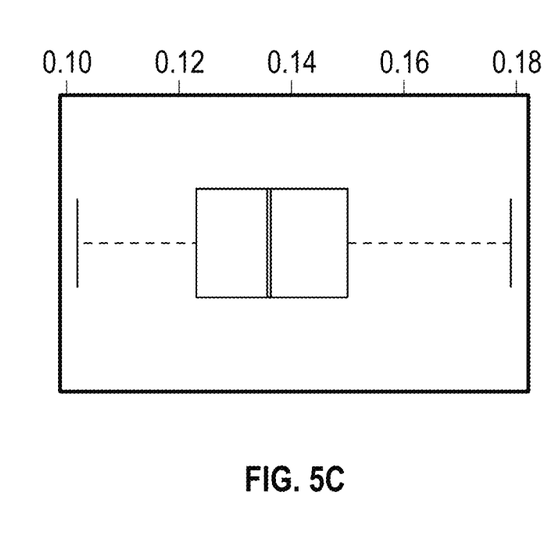
Figure 5D:
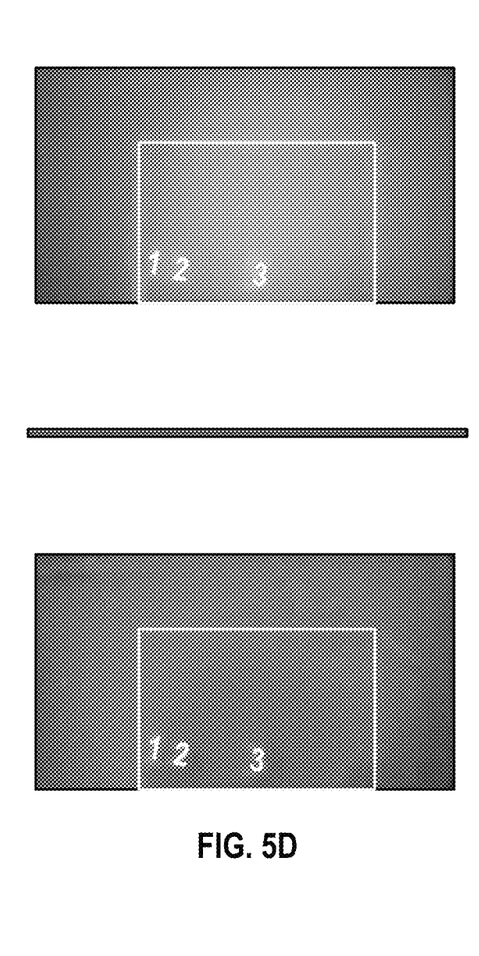
Figure 5E:
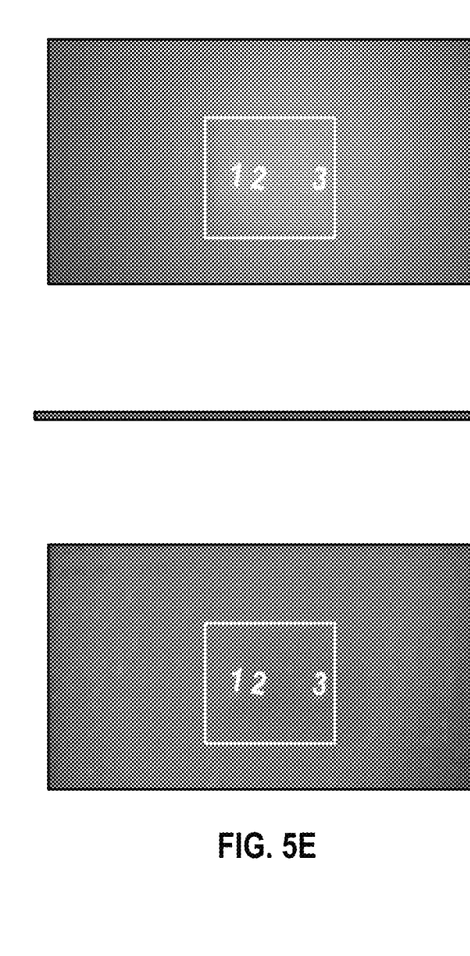

FIGS. 5B and 5C show the boxplots of the UIQM scores. FIG. 5B shows two boxplots, where the boxplot 1 shows the raw frame UIQM score and the boxplot 2 shows the clarified frame UIQM score. The vertical axis represents the UIQM score and horizontal axis represents boxplots 1 and 2. Further, FIG. 5C shows the horizontal axis of the boxplot difference of the UIQM scores of the clarified and original sample images. The visual improvement of UIQM scores is shown on FIGS. 5D and 5E, where the UQIM increased from 0.24834 to 0.39646 and from 0.19924 to 0.32388, respectively.

Figure 6A:
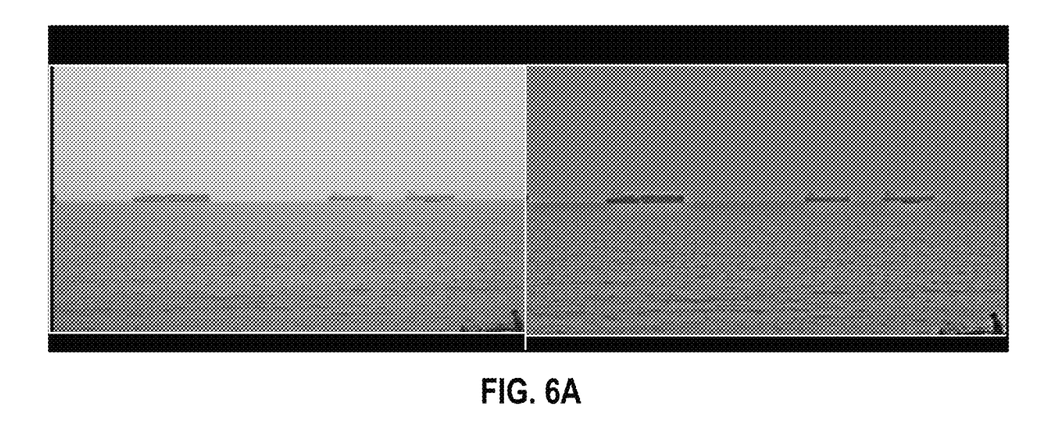
FIGS. 6A-6D shows an example in accordance with one or more embodiments.
Figure 6B:
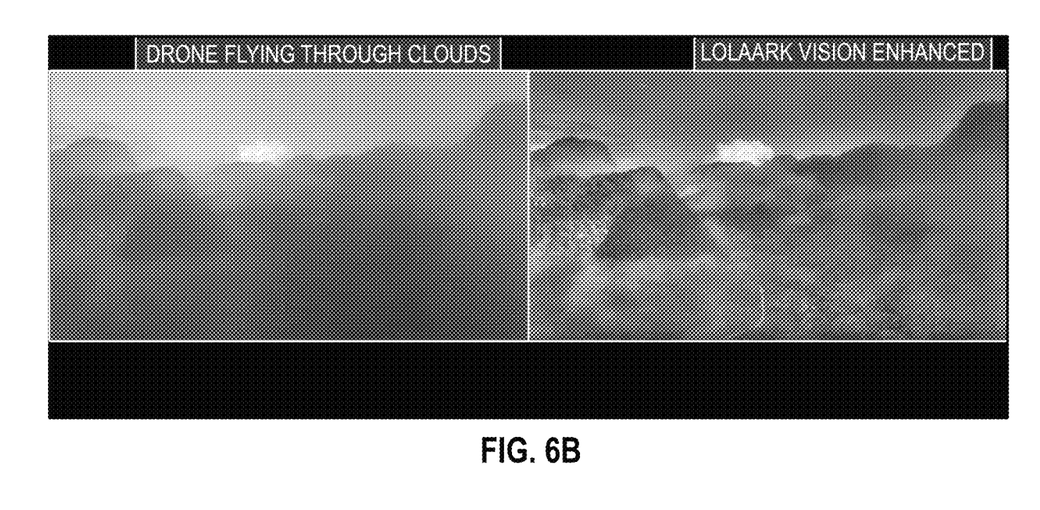
Figure 6C:
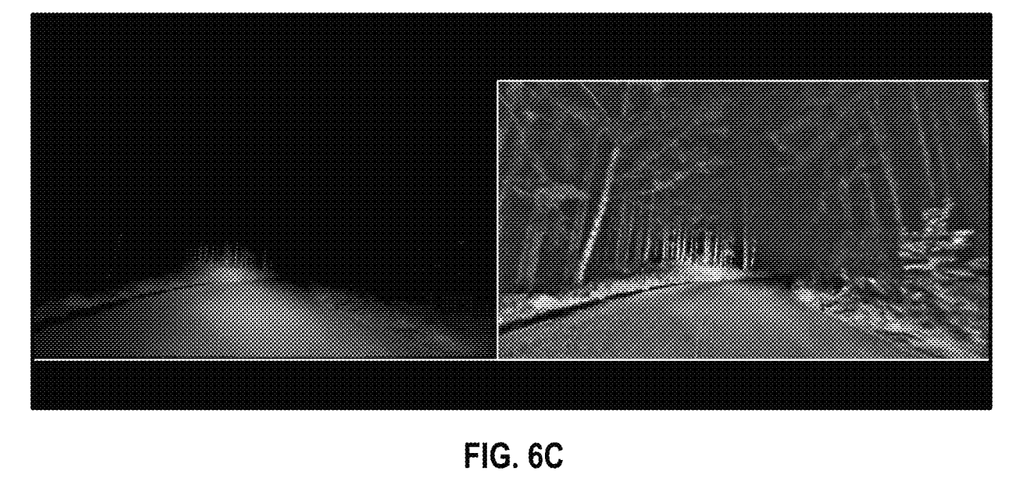
Figure 6D:
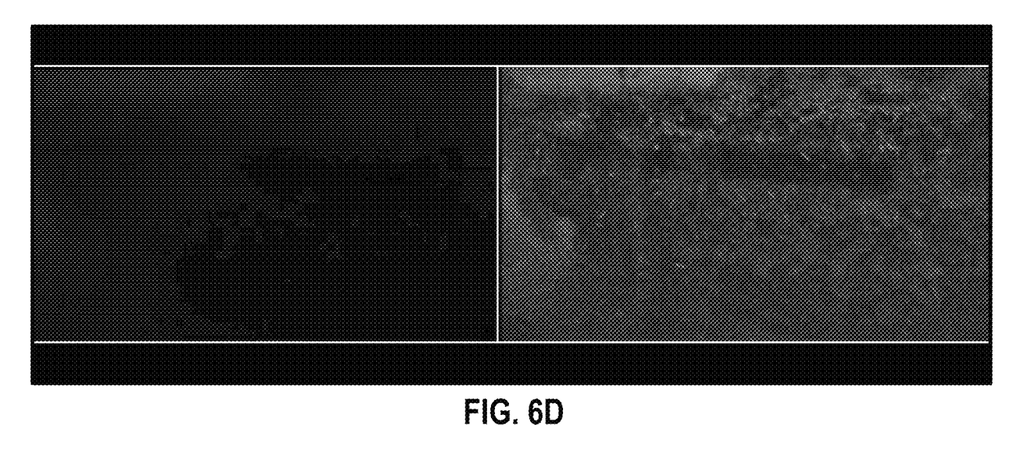

FIGS. 6A-6D show an application of the video frames clarifier in different verticals. Specifically, FIGS. 6A and 6C show the application of the video frames clarifier on land navigation vertical. FIG. 6B shows the application of the video frames clarifier in air navigation vertical and FIG. 6D shows an additional application of the video frames clarifier in subaquatic operations vertical.

Embodiments may be implemented on any suitable computing device, such as the computer system shown in FIG. 7. FIG. 7 is a block diagram of a computer system (700) used to provide computational functionalities associated with described algorithms, methods, functions, processes, flows, and procedures as described in the instant disclosure, according to an implementation. Additionally, the embodiments may be implemented as a standalone software or a plug-in using another software to operate. The illustrated computer (700) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (700) may include a computer that includes an input device, such as a keypad, keyboard, touch screen, or other device that can accept user information, and an output device that conveys information associated with the operation of the computer (700), including digital data, visual, or audio information (or a combination of information), or a GUI.

The computer (700) can serve in a role as a client, network component, a server, a database or other persistency, or any other component (or a combination of roles) of a computer system for performing the subject matter described in the instant disclosure. The illustrated computer (700) is communicably coupled with a network (710). In some implementations, one or more components of the computer (700) may be configured to operate within environments, including cloud-computing-based, local, global, or other environment (or a combination of environments).

At a high level, the computer (700) is an electronic computing device operable to receive, transmit, process, store, or manage data and information associated with the described subject matter. According to some implementations, the computer (700) may also include or be communicably coupled with an application server, e-mail server, web server, caching server, streaming data server, business intelligence (BI) server, or other server (or a combination of servers).

The computer (700) can receive requests over network (710) from a client application (for example, executing on another computer (700) and responding to the received requests by processing the said requests in an appropriate software application. In addition, requests may also be sent to the computer (700) from internal users (for example, from a command console or by other appropriate access method), external or third-parties, other automated applications, as well as any other appropriate entities, individuals, systems, or computers.

Each of the components of the computer (700) can communicate using a system bus (770). In some implementations, any or all of the components of the computer (700), both hardware or software (or a combination of hardware and software), may interface with each other or the interface (720) (or a combination of both) over the system bus (770) using an application programming interface (API) (750) or a service layer (760) (or a combination of the API (750) and service layer (760). The API (750) may include specifications for routines, data structures, and object classes. The API (750) may be either computer-language independent or dependent and refer to a complete interface, a single function, or even a set of APIs. The service layer (760) provides software services to the computer (700) or other components (whether or not illustrated) that are communicably coupled to the computer (700). The functionality of the computer (700) may be accessible for all service consumers using this service layer. Software services, such as those provided by the service layer (760), provide reusable, defined business functionalities through a defined interface. For example, the interface may be software written in JAVA, C++, or other suitable language providing data in extensible markup language (XML) format or other suitable format. While illustrated as an integrated component of the computer (700), alternative implementations may illustrate the API (750) or the service layer (760) as stand-alone components in relation to other components of the computer (700) or other components (whether or not illustrated) that are communicably coupled to the computer (700). Moreover, any or all parts of the API (750) or the service layer (760) may be implemented as child or sub-modules of another software module, enterprise application, or hardware module without departing from the scope of this disclosure.

The computer (700) includes an interface (720). Although illustrated as a single interface (720) in FIG. 5, two or more interfaces (720) may be used according to particular needs, desires, or particular implementations of the computer (700). The interface (720) is used by the computer (700) for communicating with other systems in a distributed environment that are connected to the network (710). Generally, the interface (720 includes logic encoded in software or hardware (or a combination of software and hardware) and operable to communicate with the network (710). More specifically, the interface (720) may include software supporting one or more communication protocols associated with communications such that the network (710) or interface's hardware is operable to communicate physical signals within and outside of the illustrated computer (700).

The computer (700) includes at least one computer processor (730). Although illustrated as a single computer processor (730) in FIG. 7, two or more processors may be used according to particular needs, desires, or particular implementations of the computer (700). Generally, the computer processor (730) executes instructions and manipulates data to perform the operations of the computer (700) and any algorithms, methods, functions, processes, flows, and procedures as described in the instant disclosure.

The computer (700) also includes a memory (780) that holds data for the computer (700) or other components (or a combination of both) that can be connected to the network (710). For example, memory (780) can be a database storing data consistent with this disclosure. Although illustrated as a single memory (780) in FIG. 7, two or more memories may be used according to particular needs, desires, or particular implementations of the computer (700) and the described functionality. While memory (780) is illustrated as an integral component of the computer (700), in alternative implementations, memory (780) can be external to the computer (700).

The application (740) is an algorithmic software engine providing functionality according to particular needs, desires, or particular implementations of the computer (700), particularly with respect to functionality described in this disclosure. For example, application (740) can serve as one or more components, modules, applications, etc. Further, although illustrated as a single application (740), the application (740) may be implemented as multiple applications (740) on the computer (700). In addition, although illustrated as integral to the computer (700), in alternative implementations, the application (740) can be external to the computer (700).

There may be any number of computers (700) associated with, or external to, a computer system containing computer (700), each computer (700) communicating over network (710). Further, the term "client," "user," and other appropriate terminology may be used interchangeably as appropriate without departing from the scope of this disclosure. Moreover, this disclosure contemplates that many users may use one computer (700), or that one user may use multiple computers (700).

In some embodiments, the computer (700) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (Saas), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for image and video clarification, the method comprising:
obtaining a plurality of raw images using a digital or analog camera;
determining, by a computer processor, parameters for a set of framelet clarification filters in an image processing software;
processing, by the computer processor, the plurality of raw images using the set of framelet clarification filters to filter each raw image, wherein the set of framelet clarification filters generates decomposition analysis coefficients that are non-linearly transformed and applies a synthesis multiscale transform by combining the transformed analysis coefficients or other multiscale transform coefficients obtained from the generation of the decomposition analysis coefficients; and displaying the processed plurality of raw images via clarifying software to obtain a clear video image with an increased radius of visibility in real time, wherein the clarifying software is a combination of the imaging processing software and the set of the framelet analysis and synthesis clarification filters, wherein the framelet clarification filters generate the decomposition analysis coefficients and apply the synthesis multiscale transform on the non-linearly transformed decomposition analysis coefficients to obtain the processed plurality of raw images with the increased radius of visibility, and wherein the non-linearly transformed decomposition analysis coefficients depend on the sparsity, orientation, and anisotropy of the framelet clarification filters.

2. The method of claim 1, wherein the processing the plurality of raw images further comprises:
converting, by the computer processor, red, blue, and green (RGB) channeled image into hue, saturation, and value (HSV) channeled image;
applying, by the computer processor, a denoising filter on a hue channel to obtain a denoised hue channel of the HSV image;
applying, by the computer processor, a transformation on a saturation channel to obtain a transformed saturation channel image;
applying, by the computer processor, an algorithm on a value channel to obtain a monochromatic illumination normalized output for intensity;
converting, by the computer processor, the HSV channeled image to the RGB channeled image.

3. The method of claim 1, wherein the video is sequenced into a plurality of consecutive images played at a predetermined frequency and the processing is applied to the plurality of consecutive images.

4. The method of claim 1, wherein the obtained plurality of raw images include binary images, monochrome images, color images, and multispectral images.

5. The method of claim 1, wherein pixel values are extracted from the plurality of raw images and converted to float point values.

6. The method of claim 2, wherein the denoising filter applied on the hue channel is a median filter.

7. The method of claim 1, wherein the plurality of raw images are obtained in a plurality of verticals, the plurality of verticals including under water, land, and air verticals.

8. The method of claim 7, wherein the parameters for processing the plurality of raw images are modified based on a vertical being processed.

9. The method of claim 1, wherein the parameters for processing the plurality of raw images are modified based on an image quality of the obtained raw images.

10. A system, comprising:
a camera coupled to a computer processor;
a display for displaying a processed plurality of raw images via a clarifying software to obtain a clear video image with an increased radius of visibility in real time, wherein the clarifying software is a combination of the imaging processing software and a set of the framelet analysis and synthesis clarification filters; and
the computer processor, wherein the computer processor comprises functionality for:
obtaining a plurality of raw images using a digital or analog camera;
determining parameters for the set of framelet clarification filters in an image processing software; and
processing the plurality of raw images using the set of framelet clarification filters to filter each raw image, wherein the set of framelet clarification filters generates decomposition analysis coefficients that are non-linearly transformed and applies a synthesis multiscale transform by combining the transformed analysis coefficients or other multiscale transform coefficients obtained from the generation of the decomposition analysis coefficients, wherein the framelet clarification filters generate the decomposition analysis coefficients and apply the synthesis multiscale transform on the non-linearly transformed decomposition analysis coefficients to obtain the processed plurality of raw images with the increased radius of visibility, and wherein the non-linearly transformed decomposition analysis coefficients depend on the sparsity, orientation, and anisotropy of the framelet clarification filters.

11. The system of claim 10, wherein the computer processor further comprises functionality for:
converting red, blue, and green (RGB) channeled image into hue, saturation, and value (HSV) channeled image;
applying a denoising filter on a hue channel to obtain a denoised hue channel of the HSV image;
applying a transformation on a saturation channel to obtain a transformed saturation channel image;
applying an algorithm on a value channel to obtain a monochromatic illumination normalized output for intensity;
converting the HSV channeled image to the RGB channeled image.

12. The system of claim 10, wherein the video is sequenced into a plurality of consecutive images played at a predetermined frequency and the processing is applied to the plurality of consecutive images.

13. The system of claim 10, wherein the obtained plurality of raw images include binary images, monochrome images, color images, and multispectral images.

14. The system of claim 10, wherein pixel values are extracted from the plurality of raw images and converted to float point values.

15. The system of claim 11, wherein the denoising filter applied on the hue channel is a median filter.

16. The system of claim 10, wherein the plurality of raw images is obtained in a plurality of verticals, the plurality of verticals including under water, land, and air verticals.

17. The system of claim 16, wherein the parameters for processing the plurality of raw images are modified based on a vertical being processed.

18. The system of claim 10, wherein the parameters for processing the plurality of raw images are modified based on an image quality of the obtained raw images.

19. A non-transitory computer readable medium storing instructions executable by a computer processor, the instructions comprising functionality for:
obtaining a plurality of raw images using a digital or analog camera;
determining parameters for a set of clarification filters in an image processing software;

processing the plurality of raw images using the set of framelet clarification filters to filter each raw image, wherein the set of framelet clarification filters generates decomposition analysis coefficients that are non-linearly transformed and applies a synthesis multiscale transform by combining the transformed analysis coefficients or other multiscale transform coefficients obtained from the generation of the decomposition analysis coefficients; and displaying the processed plurality of raw images via clarifying software to obtain a clear video image with an increased radius of visibility in real time, wherein the clarifying software is a combination of the imaging processing software and the set of the framelet analysis and synthesis clarification filters, wherein the framelet clarification filters generate the decomposition analysis coefficients and apply the synthesis multiscale transform on the non-linearly transformed decomposition analysis coefficients to obtain the processed plurality of raw images with the increased radius of visibility, and wherein the non-linearly transformed decomposition analysis coefficients depend on the sparsity, orientation, and anisotropy of the framelet clarification filters.

20. The non-transitory computer readable medium of claim 19, wherein the instructions further comprise functionality for:

converting red, blue, and green (RGB) channeled image into hue, saturation, and value (HSV) channeled image;

applying a denoising filter on a hue channel to obtain a denoised hue channel of the HSV image;

applying a transformation on a saturation channel to obtain a transformed saturation channel image;

applying an algorithm on a value channel to obtain a monochromatic illumination normalized output for intensity;

converting the HSV channeled image to the RGB channeled image.

* * * * *